United States Patent [19]

Wille et al.

[11] 4,144,199

[45] Mar. 13, 1979

[54] SAFRANIC ACID ESTER PERFUME COMPOSITIONS

[75] Inventors: Hans J. Wille; Wilhelmus M. B. Konst, both of Naarden; Jan Kos, Huizen, all of Netherlands

[73] Assignee: Naarden International, N.V., Naarden, Netherlands

[21] Appl. No.: 813,322

[22] Filed: Jul. 6, 1977

Related U.S. Application Data

[63] Continuation of Ser. No. 551,553, Feb. 21, 1975, abandoned.

[30] Foreign Application Priority Data

Feb. 22, 1974 [GB] United Kingdom ............... 08166/74

[51] Int. Cl.² .............................................. C11B 9/00
[52] U.S. Cl. .................................. 252/522; 252/89 R; 252/108; 424/64; 424/65; 426/538; 728/358; 131/17 R
[58] Field of Search ........................................ 252/522

[56] References Cited

FOREIGN PATENT DOCUMENTS

| | | |
|---|---|---|
| 2174306 | 10/1973 | France. |
| 2022216 | 11/1970 | Fed. Rep. of Germany. |
| 7211248 | 2/1973 | Netherlands. |
| 7211893 | | Netherlands. |
| 7212426 | 3/1973 | Netherlands. |
| 7301451 | 8/1973 | Netherlands. |
| 7304364 | 10/1973 | Netherlands. |
| 7304365 | 10/1973 | Netherlands. |

Primary Examiner—Veronica O'Keefe
Attorney, Agent, or Firm—Stevens, Davis, Miller & Mosher

[57] ABSTRACT

Safranic acid esters having the general formula

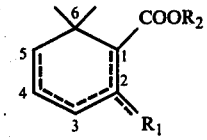

wherein the dotted lines represent two conjugated double bonds in the positions 2 endocyclic and 4 ($\alpha$-isomer), 1 and 3 ($\beta$-isomer) or 2 exocyclic and 3 ($\gamma$-isomer), $R_1$ represents an alkyl group containing at least 2 carbon atoms, or, in the $\gamma$isomers an alkylidene group with 2 or 3 carbon atoms and $R_2$ represents an alkyl or alkenyl group with 3 or 4 carbon atoms in the form of a perfumed product or flavoring composition. A process for the preparation of a perfumed product or flavoring composition wherein the safranic acid esters are incorporated with other suitable constituents.

4 Claims, No Drawings

SAFRANIC ACID ESTER PERFUME COMPOSITIONS

This is a continuation of application Ser. No. 551,553 filed Feb. 21, 1975, now abandoned.

BACKGROUND OF THE INVENTION

This invention relates to novel chemical compounds and their use as flavor odor agents. More specifically this invention relates to cycloaliphatic unsaturated esters which are valuable food and tobacco flavor agents and perfume odor agents.

Increasing attention is being devoted to the preparation and utilization of artificial perfuming and odor modifying agents in perfumes and perfumed products, and of artificial flavoring and taste modifying agents in foodstuffs, beverages, pharmaceuticals, and tobacco. This attention has been stimulated not only because of the inadequate quantity of natural perfume and flavoring materials available, but, perhaps even more importantly, because of the need for materials which can combine several natural nuances, will blend better with other perfuming or flavoring compositions, and will give perfumed or flavored products which can be specifically tailored to a given a use and because they can be duplicated at will. This latter factor confers a major advantage to artificial perfuming and food flavoring agents, since natural products, such as essential oils, extracts, concentrates, and the like are subject to wide variation because of changes in the quality, type or treatment of the raw material.

STATE OF THE ART

This invention deals with esters of safranic acid and some homologues thereof and with their use as flavour and odor agents.

Safranic acid occurs in three isomeric forms, known as $\alpha$-, $\beta$-, and $\gamma$-safranic acid, having the structures I, II, and III respectively:

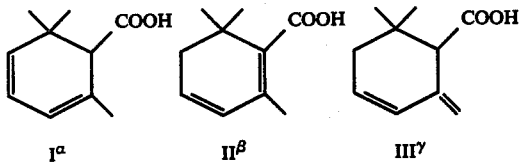

For simplicity in referring to the various compounds of this invention, in analogy with the isomers of safranic acid, the following nomenclature is used throughout this specification:

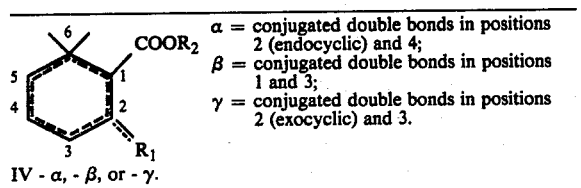

IV - $\alpha$, - $\beta$, or - $\gamma$.

$\alpha$ = conjugated double bonds in positions 2 (endocyclic) and 4;
$\beta$ = conjugated double bonds in positions 1 and 3;
$\gamma$ = conjugated double bonds in positions 2 (exocyclic) and 3.

$\alpha$-Safranic acid is described in Helv.Chim.Acta 31 (1948) 134 $\beta$-safranic acid in Berichte 74 (1941) 1242 and $\alpha$- and $\gamma$-safranic acids are mentioned in Helv.-Chim.Acta 33 (1950) 1746.

Also some methyl- and ethyl esters of safranic acid are described in the literature:

Ethyl $\alpha$-safranate in Helv.Chim.Acta 31 (1948) 134;
Methyl $\alpha$- and $\gamma$-safranates and ethyl $\alpha$- and $\gamma$-safranates are mentioned in Helv.Chim.Acta 33 (1950) 1746;
Ethyl $\beta$-safranate is prepared in Helv.Chim.Acta 38 (1955) 1863;
Methyl $\beta$-safranate is mentioned in Compt.Rend.Ser.C 262 (1966) 1725, in Bull.Soc.Chim.France (1966) 3874, and in Agr.Biol.Chem. 34 (1970) 198;
Ethyl $\alpha$-, $\beta$-, and $\gamma$-safranates are prepared in Helv.Chim.Acta 54 (1971) 1767;

Esters of $\alpha$-, $\beta$-, and $\gamma$-safranic acid with saturated alcohols containing 1–4 carbon atoms are also mentioned in Dutch Patent Applications 72.11248 and 73.01451, open to public inspection on August, 17th, 1972, and August, 7th, 1973, respectively.

In these publications the safranates are used as intermediate; in syntheses of safranal, damascenones or abscisic acid. However, nowhere mention is made of the organoleptic properties of these esters.

DESCRIPTION OF THE INVENTION

We have now found that the safranic acid esters and some novel homologues thereof possess useful organoleptic properties and can be used for flavoring and perfuming a wide range of products. The compounds of the invention may be used, combined with other flavoring agents, diluents or carriers, for flavoring foodstuffs, beverages or tobacco products; they may be compounded with other odoriferous compounds to make perfumery compositions, in the manner conventional in the perfumery art.

The odoriferous esters of this invention have the general formula IV:

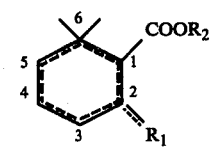

wherein the dotted lines represent two conjugated double bonds in the positions 2 (endocyclic) and 4 ($\alpha$-isomer), 1 and 3 ($\beta$-isomer), or 2 (exocyclic) and 3 ($\gamma$-isomer);

$R_1$ represents an alkyl group, or, in the $\gamma$-isomers an alkylidene group, with 1–3 carbon atoms; and $R_2$ represents an alkyl- or alkenyl group with 1–4 carbon atoms.

The compounds of formula IV wherein $R_1$ is $CH_3$ ($\alpha$- or $\beta$-isomers) or $CH_2$ ($\gamma$-isomers) and $R_2$ is $CH_3$ or $C_2H_5$ are known compounds, as these esters are the methyl- and ethyl safranates, described in the literature cited above. The other compounds of formula IV are new.

The compounds of this invention may be prepared by methods described in the cited literature or for the homologues of the safranic acid esters in an analogous way. The methods described in the examples are modifications of the method given in Dutch Patent Application 73.01451, pp 11–13, where the $\alpha$-, $\beta$-, and $\gamma$-safranic acid ethyl esters are prepared from mesityl oxide and ethyl acetoacetate according to reaction scheme A, as intermediates in a synthesis of damascenone analogues.

REACTION SCHEME A

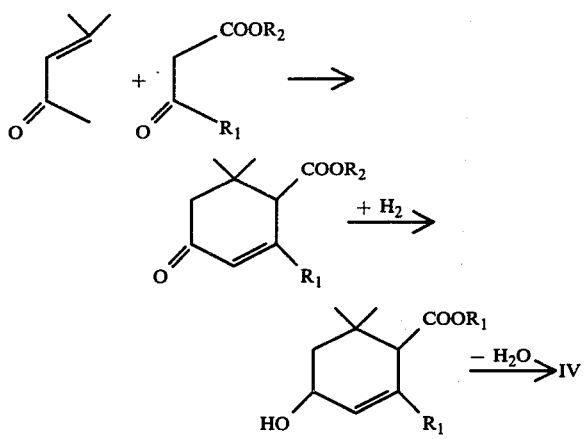

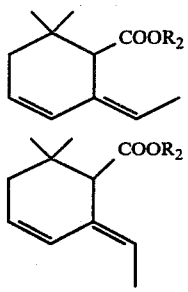

IV cis-γ

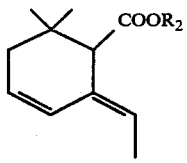

IV trans-γ

We have found that the ratio of α:β:γ isomers obtained in the last step of this reaction sequence can be altered by varying the reaction time. In general starting from alkyl or alkenyl acetoacetates a mixture of compounds IV (with $R_1 = CH_3$ or $CH_2$) is obtained predominantly consisting of β-isomer (ca 60%), and about 20% each of the α- and γ-isomers. In the syntheses of the compounds with general formula IV with $R_1$ containing two or three carbon atoms, extension of the reaction time in the dehydration step leads to the formation of a reaction mixture for over 90% consisting of the γ-isomer. A shorter dehydration time gives a higher content of the α- and β-isomers, although even then the γ-isomer will be the major component in the mixture obtained. The three isomers of the compounds with the general formula IV can be separated by preparative gas liquid chromatography. The preparation of the compounds of this invention is illustrated in Example 1 with the synthesis of a mixture of the α-, β-, and γ-isomers of the compounds with formula IV, wherein $R_1 = C_2H_5$ (α- or β-isomers) or $C_2H_4$ (γ-isomer), and $R_2 = C_2H_5$. By varying $R_1$ and $R_2$ in the the condensation reaction between mesityl oxide and an acylacetic acid ester (see reaction scheme A) other compounds of general formula IV are obtainable. It will be clear to those skilled in the art that other ways of reducing the cyclohexenone (e.g. Meerwein-Ponndorf reduction) can be used. Examples can be found in the cited journal references. Analogous to the method described in Example 1 following compounds of the general formula IV were prepared:

| $R_1$ | $R_2$ | Boiling point °C | $n_D^{20}$ |
|---|---|---|---|
| $CH_3$ or $CH_2$ | $CH_3$ | 37–40/3 mm Hg | 1.4820 |
| id | $C_2H_5$ | 70–76/5 mm Hg | 1.4790 |
| id | $CH_2CH=CH_2$ | 78–79/2 mm Hg | 1.4884 |
| id | $CH_2CH(CH_3)_2$ | 68–73/2 mm Hg | 1.4747 |
| $C_3H_7$ or $C_3H_6$ | $C_2H_5$ | 78–82/3 mm Hg | 1.4832 |

As already mentioned all reaction products obtained contain α-, β-, and γ-isomers. The γ-isomers of formula IV with $R_1$ containing two or three carbon atoms exist in two geometrical isomers, cis and trans, as shown in the following two formulae (IV, with $R_1 = C_2H_4$).

The amounts of the two γ-isomers, formed by the reaction-sequence described, are broadly equal.

The compounds of the invention have been found to possess very useful organoleptic properties. Although there are minor differences in their flavor and fragrance character, it is not always necessary to separate the isomers because the mixture of isomers can be used as such for the purposes of this invention. The isomers show closely related smells, as can be seen from the following descriptions, drafted by skilled perfumers and flavorists.

Ethyl safranate (Mixture, α:β:γ = 20:60:20) (Formula IV, $R_1 = CH_3$ or $CH_2$, $R_2 = C_2H_5$):
The main impression of this mixture can be described as herbal, spicy (rosemary, spike, laurel) and fruity (apple, prune) with a distinct undertone of roses and wood.

Ethyl α-safranate (Formula IV-α, $R_1 = CH_3$, $R_2 = C_2H_5$): The woody, ionone-like undertone is somewhat stronger than in the mixture of the three isomers.

Ethyl β-safranate (Formula IV-β, $R_1 = CH_3$, $R_2 = C_2H_5$): The herbal, spicy character is more pronounced, although a great similarity with the mixture does exist.

Ethyl γ-safranate (Formula IV-γ, $R_1 = CH$, $R_2 = C_2H_5$): A more fruity character (apple, prune) can be observed, but the difference with the mixture of the three isomers is small.

Methyl safranate (Mixture) (Formula IV, $R_1 = CH_3$ or $CH_2$, $R_2 = CH_3$): has a less fruity character than ethyl safranate. The herbal, spicy aspects are stronger. In aftersmell there are some sweet hints of tonka.

Allyl safranate (Mixture) (Formula IV, $R_1 = CH_3$ or $CH_2$, $R_2 = C_3H_5$): The odor character is nearly identical with ethyl safranate, but less intense.

Isobutyl safranate (Mixture) (Formula IV, $R_1 = CH_3$ or $CH_2$, $R_2 = (-C_4H_9)$): The main aspects are herbal, spicy, with a striking pearlike character. Especially suitable for flavoring purposes.

Ethyl 6,6-dimethyl-2-ethylidene-3-cyclohexenecarboxylate Formula IV, $R_1 = C_2H_4$, $R_2 = C_2H_5$: This ester shows a great odor similarity with ethyl safranate, but its odor intensity is probably somewhat greater.

Ethyl 6,6-dimethyl-2-propylidene-3-cyclohexenecarboxylate Formula IV, $R_1 = C_3H_6$ $R_2 = C_2H_5$ In comparison with ethylsafranate the odor intensity is much smaller. The fruity notes of ethyl safranate have almost completely disappeared, but the herbal, spicy notes are much stronger. This ester also exhibits an earthy-woody note.

The odor characteristics may give some general hints on the usefulness of the compounds of this invention. However, the compounds will nearly always be used in combination with other flavor and fragrance materials. One can by no means predict whether a compound with a well-defined odor will behave satisfactorily in perfume or flavor compositions. Furthermore, the mere possession of an odor is not sufficient for a compound to be useful as a perfume- or flavor ingredient. Some of the other requirements are:

compatability with other perfume and flavor materials and with the substrate to be perfumed or flavored;

flavorable toxicological and dermatological properties;

the power to give complicated perfume or flavor compositions a general character or a specific note as conceived by a skilled perfumer or flavorist. The compounds of this invention fulfil these requirements.

When compounds are tested for possible use in perfume or flavor compositions, threshold values are often determined. As the compounds of this invention were found to blend very well with the known damascones and damascenones, described in e.g. British Patent Specification No. 1.240.309 and Dutch Patent Application No. 72.11248, and with the homologues of the damascones and damascenones, described in our copending U.S. Ser. No. Application 551,552, the odor threshold value of all these compounds and of some mixtures thereof were determined. The procedure used is described in: Manual on Sensory Testing Methods, A.S.T.M. Special Technical Publication No. 434, Philadelphia, 1968, page 30, method 3b and on page 61. To show some of the pecularities of the compounds of this invention, and the interactions of these compounds with other perfume and flavor agents, results of these tests are given in the table:

| Code | Compound | Odor threshold value[a] | Odor description[b] |
|---|---|---|---|
| A | Ethyl safranate (Mixture, α: β: γ 32 20:60:20) | $6 \times 10^{-6}$ | General fruity, but not apple-like |
| B | Ethyl 6,6-dimethyl-2-ethylidene-3-cyclohexenecarboxylate | $10 \times 10^{-6}$ | Apple-like |
| C | α-Damascone[c] | $1 \times 10^{-6}$ | Apple-like |
| D | β-Damascone[d] | $6 \times 10^{31\,6}$ | Apple-like |
| E | Damascenone homologue[e] | $8 \times 10^{-6}$ | Naar threshold: fruity, in higher concentration coffee-like |
| F | Damascone homologue[f] | $0.8 \times 10^{-6}$ | Apple-like. |
| G | A + E (5 : 2) | $0.2 \times 10^{-6}$ | Distinctly apple-like |
| H | B + E (5 : 2) | $2 \times 10^{-6}$ | Apple-like |
| I | A + D (5 : 2) | $0.6 \times 10^{-6}$ | Apple-like. |

Notes:
[a] All compounds and mixtures were dissolved in odorless diethyl phthalate.
[b] The threshold values were determined using layman-observers. They were asked to give a general odour description. The descriptions in the table are quite different from those given by experts.
[c] = trans 2,6,6-trimethyl-1-crotonyl-2-cyclohexane, see e.g. British Patent Specification 1.240.309.
[d] = trans 2,6,6-trimethyl-1-crotonyl-1,3-cyclohexadiene, see e.g. British Patent Specification 1.240.309.
[e] = The reaction product of Example .9. of our copending Application U.S Serial No. 551,552 now abandoned
[f] = The reaction product of Example .8. of our copending Application U.S. Serial No. 551,552 now abandoned One can see from this table that the mixtures G, H, and I all have considerably lower threshold values than the individual components, this lowering being probably the first occasion in which synergism in the field of olfaction could be substantiated by quantitative data. Equally striking is the fact that a combination of the compounds with codes A an E has a distinct apple-like odor, whereas the individual components have a general fruity odor, with no reminiscence of the odor of apples.

It turns out therefore that the esters of this invention when used in combination with cycloaliphatic unsaturated ketones such as α-damascone, β-damascenone, or one or more of the homologues thereof, which are described in our copending U.S. Ser. No. 551,552 now abandoned, specifically enhance the perfuming and flavoring properties of these ketones, making optimal flavor and odor effects attainable. The esters as well as the ketones may be present as isomeric mixtures. To obtain these remarkable effects the relative amounts of the esters of this invention and of the unsaturated ketones can vary from about 1:20 to about 20:1.

As will be understood by those skilled in the use of flavoring materials and perfume agents, it is not possible nor feasible to give specific instructions for the use of the esters of this invention either alone or in combination with said ketones in such arts, as there are too many factors which govern the absolute amounts of materials to be used.

Among such factors are the personal preference of the flavor expert of perfumer, the cost of materials, the nature of the particular composition, the flavor or odor effect to be achieved, etc. Nonetheless, it will be readily apparent to experts how to employ the esters of this invention in particular situations. If the esters are used as fragrances in combination with the unsaturated ketones the quantity must be at least 0.1 ppm ester; the quantity of the esters alone must be at least 0.5 ppm in the final perfumed product.

The maximum quantity is 1000 ppm in the final perfumed product. For use of the ester as flavouring agent the quantity lies between 0.001 ppm and 1000 ppm in the final foodstuff.

Perfumery compositions containing the esters of this invention may find use in a wide variety of perfumed materials. For example such compositions may be used in soap, detergent, or deodorant compositions, in cosmetic preparations such as cologne waters, toilet waters, face creams, body lotions, talcum powders, sun cream preparations and shave lotions. Flavor compositions containing esters of this invention may find use in the flavoring of foodstuffs, beverages, pharmaceuticals or tobacco. The esters may be used to improve the flavor of beverages such as fruit juices.

In the following Examples, the invention is illustrated in a more detailed manner. All quantities in the Examples 2–11 are expressed on a weight basis. The Examples are not to be considered as necessarily constituting a limitation on the present invention.

EXAMPLE 1

-A- Preparation of Ethyl 6,6-dimethyl-2-ethyl-4-oxo-2-cyclohexenecarboxylate.

A mixture of 294 g. of mesityl oxide, 432 g. of α-propionylacetic acid ethyl ester, 150 g. of cyclohexane and 75 g. of zinc chloride was stirred at boiling temperature of the mixture during 60 h. The water resulting from the reaction was separated via a Dean-Stark tube.

At room temperature the mixture was stirred during 10 minute with 300 g. of a 10% HCl-solution and 150 g. of cyclohexane. After washing with water, the NaHCO$_3$-solution and again water, cyclohexane was distilled off from the separated organic layer and the residue fractionated in vacuo which gave 272 g. of a product, b.p. 126°–135° C./2 Torr, $n_D^{20}$ 1.4788, which had a 90% content of ethyl 6,6-dimethyl-2-ethyl-4-oxo-2-cyclohexenecarboxylate, as determined by GLC and NMR-analysis.

-B- Preparation of a mixture of Ethyl 6,6-dimethyl-2-ethylidene-3-cyclohexenecarboxylate, Ethyl 6,6-dimethyl-2-ethyl-1,3-cyclohexadienecarboxylate and Ethyl 6,6-dimethyl-2-ethyl-2,4-cyclohexadienecarboxylate. A solution of 25 g. of $NaBH_4$ and 0.25 g. of NaOH in 100 g. of water was added dropwise in 30 minutes into a solution of 270 g. of ethyl 6,6-dimethyl-2-ethyl-4-oxo-2-cyclohexenecarboxylate in 100 g. of ethanol. During the addition the reaction vessel was cooled to 35°–40° C. The reaction mixture was stirred for an additional 4 hours without cooling, whereby the temperature in the reaction vessel slowly reached room temperature. The reaction mixture was diluted with 200 g. of toluene and washed with 100 ml. of a 10% acetic acid solution. After separating and drying 2 g. of p-toluenesulphonic acid was added and the solution was refluxed during 2 hours.[1]

[1] When the reflux time was extended to 7 hours, the only reaction product was the γ-isomer, b.p. 77°–80° C./2 Torr, $n_D^{20}$ 1.4835.

After washing with a 5% $NaHCO_3$ solution and water, the volatile solvent was removed in vacuo yielding 263 g. of an oily liquid which was subjected to fractional distillation. The second fraction of the distillate (167 g.) had a boiling point of 74°–90° C./2 Torr and a $n_D^{20}$ of 1.4819. It consisted of a mixture of the three title compounds. The α- and β-isomers formed 15 and 5% respectively, the remaining 80% being the γ-isomer.

EXAMPLE 2

Perfume compositions of the rose type.
Three rose type compositions were prepared by mixing the following ingredients:

| Compound | Composition A | B | C |
|---|---|---|---|
| Cinnamic alcohol | 15 | 20 | 5 |
| Phenyl ethylalcohol | 400 | 380 | 435 |
| Rhodinol | 260 | 280 | 250 |
| 1-Citronellol | 160 | 140 | 150 |
| Phenylacetaldehyde dimethylacetal | 40 | 50 | 25 |
| Methylionone α | 15 | — | 5 |
| Hydroxycitronellal | 5 | — | 10 |
| Gyrane (N)[1] | 30 | 20 | 15 |
| Phenylethyl propionate | 15 | 30 | 25 |
| Ceranyl acetate | 10 | 20 | 30 |
| Citronellyl ethyl oxalate | 20 | 10 | 5 |
| Eugenol 10 % sol.[2] | 15 | 5 | 10 |
| Undecenal 10 % sol.[2] | 5 | — | 5 |
| Rose oxide 10 % sol.[2] | 5 | 5 | 5 |
| Methylionone γ | — | 10 | — |
| Linalool | — | 10 | — |
| Lauric aldehyde 10 % sol.[2] | — | 10 | — |
| Rosana NB 131[3] | — | 5 | — |
| Geranium oil Bourbon | — | — | 10 |
| Rose absolute 10 % sol.[2] | — | — | 5 |
| | 995 | 995 | 990 |

[1]. Fragrance material, available from Naarden International
[2]. In diethyl phthalate.
[3]. Rose base, available from Naarden International.

A. By adding to 99.5 g. of mixture A 0.5 g. of a 1 % solution in dietthyl phthalte of ethyl surfranate the composition becomes more brilliant than the basic composition, with a more pronounced natural character of roses, accentuated by a fruity topnote.
B. By adding to 99.5 g. of mixture B 0.5 g. of a 1 % solution in diethylphthalate of ethyl 6,6-dimethyl-2-ethylidene-3-cyclohexenecarboxylate, the composition instantly becomes more powerful and full bodied. The composition obtained has an exceptional brilliancy and a flowery, true to nature rose character.
C. By adding to 99 g. of mixture C 1 g. of a 1 % solution of ethyl 6,6-dimethyl-2-propylidene-3-cyclohexanecarboxylate the composition obtained has an improved richness and a more pronounced natural note than the basic composition.

EXAMPLE 3

Perfume compositions of the Fougere type.
Three fougere type compositions were prepared by mixing the following ingredients:

| Compound | Composition A | B | C |
|---|---|---|---|
| Coumarine | 30 | 25 | 15 |
| Musk ketone | 5 | 5 | 10 |
| Phenyl ethylalcohol | 80 | 90 | 100 |
| Oak moss absolute | 10 | 10 | 5 |
| Amyl salicylate | 30 | 20 | 40 |
| Rosemary oil | 30 | 35 | 40 |
| Serpolet oil | 10 | 15 | 20 |
| Lavender oil French type | 260 | 255 | 220 |
| Bergamot oil | 100 | 60 | 120 |
| Lemon oil | 40 | 60 | 30 |
| Eugenol | 10 | 15 | 5 |
| Ylang-Ylang oil I | 5 | 10 | 5 |
| Coriander oil | 5 | 5 | — |
| Clary sage oil | 5 | 10 | 10 |
| Geranium oil Bourbon | 20 | 25 | 20 |
| Musk R1[1] 10 % sol.[2] | 20 | 30 | 40 |
| Undecenal 10 % sol.[2] | 10 | 5 | 15 |
| Linalool | 70 | 50 | 75 |
| Methyl nonyl acetaldehyde 10 % sol.[2] | — | 5 | — |
| Methyl ionone γ | — | 10 | 5 |
| Tetradecanal 1 % sol.[2] | — | 5 | — |
| Thyme oil 10 % sol.[2] | — | — | 10 |
| | 740 | 745 | 785 |

[1] Fragrance material, available from Naarden International
[2] In diethylphthalate.

A. By adding of a 1% solution in diethylphthalate of ethylsafranate to 74. g. of mixture A a considerable increase in brilliancy is noted. The composition becomes richer in character and obtains a striking fruity effect.
B. By adding 0.5 g. of a 1 % solution in diethylphthalate of ethyl 6,6-dimethy-2-ethylidene-3-cyclohexenecarboxylate to 74.5 g of composition B, the composition gets richer and more full bodied. The composition obtains an enhanced brilliance and the tonality of the perfume is accentuated.
C. By adding 1.5 g. of a 1 % solution in diethylphthalate of ethyl 6,6-dimethyl-2-propylidene-3-cyclohexenecarboxylate to 78.5 g. of composition C the odor character of this composition gets a more full and warm body and a remarkable increase in brilliance is noted.

EXAMPLE 4

Perfume compositions of the pine-fantasy type.
Three pine-fantasy type compositions were prepared by mixing the following ingredients:

| Compound | Composition A | B | C |
|---|---|---|---|
| Olibanum resinoid | 20 | 10 | 10 |
| Elemi olecresin | 20 | 25 | 10 |
| Bornyl acetate liquid | 550 | 580 | 600 |
| Turpentine oil rectified | 130 | 100 | 110 |
| Orange oil terpenes | 150 | 120 | 135 |
| Rosemary oil French | 5 | 20 | 20 |
| Guaiyl acetate | 15 | 10 | 10 |
| Cistus absolute 10 % sol.[1] | 10 | — | 10 |
| Methyl nonyl acetaldehyde 10 % sol.[1] | 30 | 40 | 25 |
| Ligustral (N)[2] 10 % sol.[1] | 20 | 15 | 5 |
| Juniperberry oil | 20 | 30 | 20 |
| Oak moss absolute 10 % sol.[1] | 20 | 25 | 10 |
| Thyme oil 10 % sol. | 5 | — | — |
| Serpolet oil | — | 20 | — |
| Origanum oil | — | — | 10 |
| Synthetic Geranium oil | — | — | 5 |
| Lavender oil French | — | — | 5 |
| Laurel leaf oil | — | — | 5 |
| | 995 | 995 | 990 |

[1] In diethyl phthalate
[2] Fragrance material, available from Naarden International A. The effect of adding 5 g. of a 1 % solution in diethylphthalate of ethylsafranate to composition A (995 g.) is a considerable increase in brilliancy and natural richness of this basic composition.
B. Adding 5 g. of a 1 % solution in diethyl phthalate of ethyl 6,6-dimethyl-2-ethylidene-3-cyclohexenecarboxylate to 995 g of composition B results in a fuller, warmer character of this composition, a greater brilliancy and accentuation of the warm herbal notes.
C. By adding to 990 g. of mixture B 10 g. of a 1 % solution in diethyl phthalate of ethyl 6,6-dimethyl-2-propylidene-3-cyclohexenecarboxylate a composition with an enhanced, full bodied natural character is obtained.

EXAMPLE 5

Preparation of an imitation apple flavor.
An imition apple flavor compostion was prepared by mixing the following ingredients:

| | |
|---|---|
| Amyl acetate | 35 |
| Ethyl butyrate | 15 |
| Hexyl acetate | 3 |
| Amyl propionate | 1 |
| Orange oil Florida | 0.4 |
| Ethyl alcohol 96% | 945.6 |
| | 1000 |

An apple beverage was prepared using 0.3 g. of this flavor composition for each liter of finished beverage. Two modifications of the apple flavor composition were made by adding to the compostion 25 or 50 ppm of ethyl safranate.

The apple beverages made from these two modifications were compared with the unmodified beverage by a panel of experienced tasters. All members of this panel had a strong preference for the beverages with the addition of ethyl safranate, these beverages being more natural apple-like in odor and taste.

No significant preference existed between the beverages containing ethyl safranate, although the difference in concentration was notified.

As can be seen from this example the concentration of ethyl safranate in the finished beverage is far below the odor threshold value of the pure compound. Nonetheless its influence on the odor and taste of the beverage is clearly observable.

(25 ppm in the composition, 0.3 g. of the composition for each liter beverage; so the concentration of ethyl safranate in the beverage is $7.5 \times 10^{-9}$)

EXAMPLE 6

Preparation of an imitation apple flavor composition.
An imitation apple flavor composition was prepared according to L. Benezet, La Parfumerie Moderne, 43 (1951), No. 22, p 61–78

| | |
|---|---|
| Ethyl acetate | 50 |
| Ethyl acetoacetate | 200 |
| Ethyl formiate | 20 |
| Ethyl butyrate | 50 |
| Ethyl hexanoate | 20 |
| Ethyl heptanoate | 50 |
| Ethyl octanoate | 20 |
| Isoamyl formiate | 50 |
| Isoamyl acetate | 50 |
| Isoamyl pentanoate | 100 |
| Isoamyl hexanoate | 550 |
| Isoamyl octanoate | 100 |
| Acetaldehyde | 50 |
| Geraniol | 10 |
| Geranyl formiate | 10 |
| Geranyl acetate | 10 |
| Phenylethyl pentanoate | 20 |
| Benzaldehyde | 5 |
| Cinnamyl propionate | 50 |
| Diethyl malonate | 64 |
| Orange oil Florida | 20 |
| Rose oil | 1 |
| | 1000 |

From this composition a 1% solution in ethanol was prepared. Part of this solution was used to prepare an apple beverage, using 0.3 g of the ethanolic solution per liter of finished beverage.

To another part of the ethanolic solution 100 ppm ethyl safranate were added. Using 0.3 g. of this solution per liter finished beverage another apple flavored beverage was prepared.

Comparison of the two beverages by a panel of trained flavorist resulted in an unanimous preference for the beverage with the addition of ethyl safranate.

EXAMPLE 7

Preparation of a raspberry flavor composition.
An imitation raspberry flavour compostion was prepared by mixing the following ingredients;

| | |
|---|---|
| Geraniol | 20 |
| Vahilline | 20 |
| Maltol | 20 |
| Phenyl ethylalcohol | 50 |
| p-Hydroxybenzyl acetone | 50 |
| Methylionone α | 100 |
| Ionone β | 100 |
| Benzyl acetate | 100 |
| Isobutyl acetate | 100 |
| Ethyl acetate | 100 |
| Amyl acetate | 100 |
| Ethanol | 240 |
| | 1000 |

A 1% solution in ethanol of this composition was used as flavor in a raspberry beverage. Adding 100 ppm of ethyl safranate to the ethanolic solution resulted in an improved beverage, the taste and odor being more natural raspberry like.

EXAMPLE 8

Preparation of an imitation raspberry flavor compostion.
An imitation raspberry flavor, compostion was prepared as a modification of the recipe of L. Benezet, La Parfumerie Moderne, 43 (1951) No. 22, p 61–78.

| | |
|---|---|
| Acetyl methyl carbinol | 3 |
| Diacetyl | 2 |
| Ethyl acetate | 10 |
| Isobutyl acetate | 40 |
| Ethyl hexanoate | 10 |
| Isoamyl hexanoate | 10 |
| Hexyl acetate | 10 |
| Hexenyl acetae | 10 |
| Benzyl acetate | 50 |
| Isoamyl alcohol | 10 |
| Hexanol | 5 |
| Hexenol | 5 |
| Ionone β | 25 |
| Methylionone α | 25 |
| Orris (Concrete) oil | 15 |
| Anis aldehyde | 5 |
| Benzaldehyde | 5 |
| Phenyl ethylalcohol | 50 |
| Methyl salicylate | 10 |
| Bornyl salicylate | 10 |
| Clove bud oil | 10 |
| Orange oil sweet | 50 |
| Geranium oil | 10 |
| Coumarine | 20 |
| Vanilline | 30 |
| Aldehyde C-16 ("so-called") | 400 |
| Benzylidene mesityl oxide | 100 |
| Ethyl benzoate | 10 |
| | 940 |

0.3 g. of a 1% solution in ethanol was used for each liter of finished beverage. Addition of 100 ppm of ethyl safranate, to the alcoholic solution of the flavor composition resulted in a beverage with a better raspberry flavor.

EXAMPLE 9

Perfume compositions of the rose type.
Three rose type compositions were prepared by mixing the following ingredients:

| | Composition | | |
|---|---|---|---|
| Compound | A | B | C |
| Cinnamic alcohol | 15 | 10 | 20 |
| Trichloromethylphenylcarbinyl | | | |

-continued

Perfume compositions of the rose type.
Three rose type compositions were prepared by mixing the following ingredients:

| Compound | Composition A | B | C |
|---|---|---|---|
| acetate | 5 | 5 | — |
| Phenyl ethylalcohol | 355 | 370 | 365 |
| Rhodinol | 180 | 160 | 170 |
| Citronellol | 170 | 140 | 120 |
| Nerol | 20 | 40 | 70 |
| Phenyl acetaldehyde dimethyl-acetal | 30 | 40 | 30 |
| Methylionone α | 10 | 10 | 10 |
| Guaiyl acetate | 10 | 5 | 10 |
| Hydroxy citronellal | 10 | 15 | 17 |
| Gyrane (N)[1] | 30 | 25 | 20 |
| Phenylethyl propionate | 20 | 25 | 15 |
| Geranyl acetate | 10 | 10 | 5 |
| Citronellyl ethyl oxalate | 20 | 15 | 35 |
| Geranium oil Bourbon: | 20 | 20 | 15 |
| Rose oxide 10 % sol.[2] | 15 | 10 | 5 |
| Rosana NB 131[3] | 60 | 70 | 80 |
| Rose absolute | 5 | 5 | 5 |
| | 985 | 985 | 992 |

[1] Fragrance material, available from Naarden International
[2] In diethyl phthalate
[3] Rose base, available from Naarden International.

Three modifications of composition A were made:
(a) Addition of 1 g. of a 10% solution in diethyl phthalate of the damascone homologue from Example 8 of our copending U.S. Ser. No. 551,552 now abandoned ..., to 98.5 g. of the basic composition.

(b) Addition of 0.5 g. of a 1% solution in diethyl phthalate of ethyl safranate to 98.5 g. of the basic composition.

(c) Addition of both 1 g. of the solution mentioned under (a) and 0.5 g. of the solution mentioned under (b) to 98.5 g. of the basic composition.

Three modifications of composition B were made:
(a) Addition of 1 g. of a 10% solution in diethyl phthalate of the damascenone homologue from Example 9 of our copending British Patent Application, No. 08165/74 ..., to 98.5 g. of basic composition B.

(b) Addition of 0.5 g. of a 1% solution in diethyl phthalate of ethyl safranate to 98.5 g. of basic composition B.

(c) Addition of both 1 g. of the solution mentioned under (a) and 0.5 g. of the solution mentioned under (b) to 98.5 g. of basic composition B.

Finally three modifications of basic composition C were made:
(a) Addition of 0.5 g. of a 10% solution in diethyl phthalate of β-damascenone to 99.2 g. of the basic composition.

(b) Addition of 0.3 g. of a 1% solution in diethyl phthalate of ethyl safranate to 99.2 g. of basic composition C.

(c) Addition of both 0.5 g. of the β-damascenone solution and 0.3 g. of the ethyl safranate solution to 99.2 g. of basic composition C.

A panel of 10 trained perfumers was asked to compare the modifications with the basic compositions. In each case the basic composition was judged as being improved by the addition of the cycloailphatic unsaturated ketones (additions a), or by the additions of ethyl safranate (additions b), but the effect of the addition of both types of compounds to the basic compositions was in all three cases judged as showing more than the sum of the effects of addition (a) and (b), resulting in a composition with a very natural rose character, having a radiant, warm body, and a well balanced topnote.

EXAMPLE 10

Imitation apple flavour.

Three modifications of the basic composition of example 5 were made:

A. To 100 g. of the basic composition 2.5 g. of a 1% solution in ethanol β-damascenone were added.

B. To 100 g. of the basic composition 5 g. of a 1% solution in ethanol of ethyl safranate were added.

C. To 100 g. of the basic composition 2.5 g. of a 1% solution in ethanol of β-damascenone and 5 g of a 1% solution in ethanol of ethyl safranate were added.

These three modifications and the basic composition were compared in finished apple beverages by a panel of trained flavorists. According to this panel compositions A and B were improvements of the basic composition, but a strong preference existed for the beverage containing composition C, this modification giving the beverage a still more natural taste and odor in comparison with A and B. The imitation apple flavors of Example 5 containing 25 or 50 ppm ethylsaffranate and modification C of this Example can be used in flavoring tobacco products as described in: Merory, Food Flavorings, Composition, Manufacture and Use, Westport 1968.

EXAMPLE 11

Imitation raspberry flavour.

Three modifications of the basic composition of example 8 were made:

A. 10 g. of the basic composition were dissolved in 1000 g. of ethanol. 0.2 g. of ethyl safranate was added.

B. 10 g. of the basic composition were dissolved in 1000 g. of ethanol. 0.1 g. of a 10% solution in ethanol of the damascenone homologue of example 9 of our copending U.S. Ser. No. 551,552 now abandoned was added.

C. 10 g. of the basic composition were dissolved in 1000 g. of ethanol. 0.2 g. of ethyl safranate and 0.1 g. of a 10% solution in ethanol of the damascenone homologue of example 9 of our copending U.S. Ser. No. 551,552 now abandoned were added.

From these three modifications and from the basic compositions raspberry flavored beverages were made, using 0.3 g. of the ethanolic solutions for each liter of finished beverage. The beverages were compared by a panel of trained flavorists. Although the beverages made from the modifications A and B were judged as improvements over the beverage made from the basic composition, an unanimous preference existed for the beverage made from composition C. In the beverages made from the basic composition or from the modifications A or B the odor and taste of β-ionone is clearly observable. The beverage made from modification C is far more round in taste and odor and has a rich natural raspberry character.

We claim:

1. A process for the preparation of a perfume composition which comprises the incorporation of one or more esters having the formula

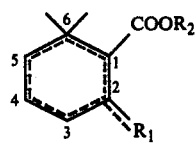

wherein the dotted lines represent two conjugated double bonds in the position 2 endocyclic and 4(α-isomer), 1 and 3 (β-isomer) or 2-exocyclic and 3(γ-isomer) and wherein $R_1$ represents an alkyl group or, in the γ-isomers and alkylidene group, with 1-3 carbon atoms and $R_2$ represents an alkyl or alkenyl group with 1-4 carbon atoms as a perfuming agent in a quantity of at least 0.5 ppm based on the final perfume composition to impart a herbal, spicy or fruity note with other constituents suitable for inclusion in such products.

2. A perfume composition which comprises one or more esters having the formula

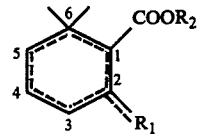

wherein the dotted lines represent two conjugated double bonds in the position 2 endocyclic and 4(α-isomer), 1 and 3 (β-isomer) or 2-exocyclic and 3(γ-isomer) and wherein $R_1$ represents an alkyl group or, in the γ-isomers an alkylidene group, with 1-3 carbon atoms and $R_2$ represents an alkyl or alkenyl group with 1-4 carbon atoms as a perfuming agent in a quantity of at least 0.5 ppm based on the final perfume composition to impart a herbal, spicy or fruity note and other constituents suitable for inclusion in such products.

3. A process for the preparation of a perfume composition which comprises the incorporation of one or more esters having the formula

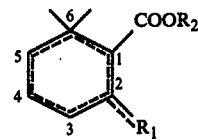

wherein the dotted lines represent two conjugated double bonds in the position 2 endocyclic and 4(α-isomer), 1 and 3 (β-isomer) or 2-exocyclic and 3(γ-isomer) and wherein $R_1$ represents an alkyl group or, in the γ-isomers an alkylidene group, with 1-3 carbon atoms and $R_2$ represents an alkyl or alkenyl group with 1-4 carbon atoms in a quantity of at least 0.1 ppm and a cycloaliphatic unsaturated ketone in an ester to ketone ratio of 1:20 to 20:1 based on the final perfume composition to impart a herbal, spicy or fruity note with other constituents suitable for inclusion in such products.

4. A perfume composition which comprises one or more esters having the formula

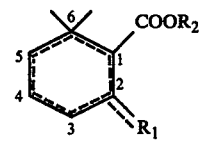

wherein the dotted lines represent two conjugated double bonds in the position 2 endocyclic and 4(α-isomer), 1 and 3 (β-isomer) or 2-exocyclic and 3(γ-isomer) and wherein $R_1$ represents an alkyl group or, in the γ-isomers an alkylidene group, with 1-3 carbon atoms and $R_2$ represents an alkyl or alkenyl group with 1-4 carbon atoms in a quantity of at least 0.1 ppm and a cycloaliphatic unsaturated ketone in an ester to ketone ratio of 1:20 to 20:1 based on the final perfume composition to impart a herbal, spicy or fruity note and other constituents suitable for inclusion in such products.

* * * * *

UNITED STATES PATENT AND TRADEMARK OFFICE
CERTIFICATE OF CORRECTION

PATENT NO. : 4,144,199

DATED : March 13, 1979

INVENTOR(S) : Hans J. WILLE, et al

It is certified that error appears in the above-identified patent and that said Letters Patent are hereby corrected as shown below:

Column 1, lines 55-60; Column 2, lines 35-40; Column 13, lines 1-7 and 22-27; and Column 14, lines 1-7 and 22-27; the formula should appear as follows:

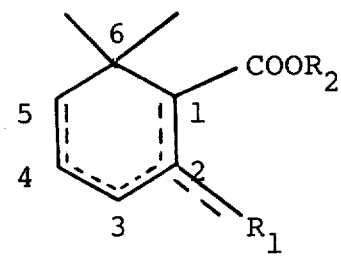

UNITED STATES PATENT AND TRADEMARK OFFICE
CERTIFICATE OF CORRECTION

PATENT NO. : 4,144,199

DATED : March 13, 1979

INVENTOR(S) : Hans J. WILLE, et al

It is certified that error appears in the above-identified patent and that said Letters Patent are hereby corrected as shown below:

Column 4, line 49, "$H_g$" should read -- $H_7$ --.

Column 5, Table D, " -Damascone" should read --  -Damascenone --.

Column 5, Notes c), "cyclohexane" should read -- cyclohexene --.

Column 7, line 66, C, "cyclohexane" should read -- cyclohexene --.

Column 11, line 17, "Citronellyl ethyl oxalate 20 15 35" should read -- Citronellyl ethyl oxalate 20 25 35 --.

Signed and Sealed this

Thirtieth Day of September 1980

[SEAL]

Attest:

SIDNEY A. DIAMOND

Attesting Officer

Commissioner of Patents and Trademarks